United States Patent
Willars et al.

(10) Patent No.: US 9,231,867 B2
(45) Date of Patent: *Jan. 5, 2016

(54) DIFFERENTIATED HANDLING OF DATA TRAFFIC WITH ADAPTATION OF NETWORK ADDRESS LOOKUP

(75) Inventors: Per Willars, Vaxholm (SE); Ayodele Damola, Solna (SE); Reiner Ludwig, Hurtgenwald (DE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 169 days.

This patent is subject to a terminal disclaimer.

(21) Appl. No.: 13/817,947

(22) PCT Filed: Oct. 22, 2010

(86) PCT No.: PCT/EP2010/065996
§ 371 (c)(1),
(2), (4) Date: Feb. 20, 2013

(87) PCT Pub. No.: WO2012/052067
PCT Pub. Date: Apr. 26, 2012

(65) Prior Publication Data
US 2013/0156038 A1    Jun. 20, 2013

(51) Int. Cl.
*H04L 12/749* (2013.01)
*H04L 12/741* (2013.01)
(Continued)

(52) U.S. Cl.
CPC ........ *H04L 45/745* (2013.01); *H04L 29/12066* (2013.01); *H04L 61/1511* (2013.01); *H04L 67/2814* (2013.01)

(58) Field of Classification Search
None
See application file for complete search history.

(56) References Cited

U.S. PATENT DOCUMENTS

| 7,228,359 | B1 | 6/2007 | Monteiro |
| 7,461,147 | B1 * | 12/2008 | Mowat et al. ............... 709/225 |
| 2004/0083307 | A1 | 4/2004 | Uysal |

(Continued)

FOREIGN PATENT DOCUMENTS

| EP | 2 109 266 A1 | 10/2009 |
| JP | 2001-251364 A | 9/2001 |

(Continued)

OTHER PUBLICATIONS

3GPP. 3GPP Generation Partnership Project; Technical Specification Group System Aspects; General Packet Radio Service (GPRS); Service Description; Stage 2 (release 10). 3GPP TS 23.060 V10.1.0 (Sep. 2010). Sep. 29, 2010.

(Continued)

*Primary Examiner* — Ayaz Sheikh
*Assistant Examiner* — Tarell Hampton (57) ABSTRACT

Differentiated Handling of Data Traffic with Adaptation of Network Address Lookup In a method of differentiated handling of data traffic, the data traffic is related to a network resource and is preceded by a lookup procedure for obtaining a network address of the network resource. A message of the lookup procedure is processed for adapting the lookup procedure. Due to the adaptation, the lookup procedure returns a network address of a replacement network resource. The replacement network resource is capable of replacing the network resource in communication of data packets of the data traffic. On the basis of the network address of the replacement network resource, differentiated handling of the data packets in said communication with the replacement network resource is accomplished.

16 Claims, 5 Drawing Sheets

(51) Int. Cl.
 H04L 29/12 (2006.01)
 H04L 29/08 (2006.01)

(56) References Cited

U.S. PATENT DOCUMENTS

| | | | | |
|---|---|---|---|---|
| 2005/0041631 | A1* | 2/2005 | Aerrabotu et al. | 370/349 |
| 2007/0180116 | A1* | 8/2007 | Kim et al. | 709/226 |
| 2008/0077705 | A1* | 3/2008 | Li et al. | 709/236 |
| 2008/0235400 | A1* | 9/2008 | Slocombe et al. | 709/245 |
| 2011/0206052 | A1* | 8/2011 | Tan et al. | 370/395.53 |

FOREIGN PATENT DOCUMENTS

| | | |
|---|---|---|
| JP | 2007-150665 A | 11/2005 |
| JP | 2009-124323 A | 6/2009 |
| JP | 2009-260986 A | 11/2009 |

OTHER PUBLICATIONS

3GPP. 3GPP Generation Partnership Project; Technical Specification Group Core Network and Terminals; Non-Access-Stratum (NAS) Protocol for Evolved Packet Systems (EPS); Stage 3 (release 10). 3GPP TS 24.301 V10.0.0 (Sep. 2010). Sep. 28, 2010.

Rekhter, Y. et al. Address Allocation for Private Internets. Network Working Group, RFC 1916. Feb. 1996.

Hinden, R. et al. Unique Local IPv6 Unicast Addresses. Network Working Group. RFC 4193. Oct. 2005.

Cotton, M. et al. Special Use IPv4 Addresses. Internet Engineering Task Force. RFC 5735. Jan. 2010.

Cain, et al. Know CN Request-Routing Mechanisms. Draft-cain-cdnp-known-request-routing-05.txt. Feb. 19, 2002.

Bilgic, et al. Quality of Service in General Packet Radio Service. Mobile Multimedia Communications, 1999. Nov. 15, 1999.

Day, et al. A Model for Content Internetworking (CDI). Draft-day-cdnp-model-09.txt. Nov. 20, 2001.

Green, et al. Content Internetworking Architectural Overview. Draft-ietf-cdi-architecture-01.txt. Jun. 1, 2002.

Cain, et al. Request-Routing Requirements for Content Internetworking. Draft-ietf-cdi-request-routing-reqs-01.txt. Jun. 1, 2002.

United States Office Action, dated Jan. 10, 2013, issued in related U.S. Appl. No. 13/039,428.

International Preliminary Report on Patentability dated Jan. 21, 2013, issued in related International Application No. PCT/EP2010/065996.

Ericsson, et al.: "IPv6-only combined with DNS64/NAT64". 3GPP TSG SA WG2 Meeting #81. S2-105312. Oct. 2010. Prague, Czech Republic.

* cited by examiner

DIFFERENTIATED HANDLING OF DATA TRAFFIC WITH ADAPTATION OF NETWORK ADDRESS LOOKUP

CLAIM OF PRIORITY

This application is a 371 of PCT/EP2010/065996, filed Oct. 22, 2010, the disclosure of which is fully incorporated herein by reference.

TECHNICAL FIELD

The present invention relates to methods for differentiated handling of network traffic and to corresponding network devices and network systems.

BACKGROUND

In communication networks, differentiated handling of data traffic may be used to distinguish between different classes of data traffic. For example, a forwarding treatment of data packets, i.e., the way of forwarding a data packet on the way towards its destination, may be controlled to provide a certain Quality of Service (QoS) level, which depends on the traffic class. In other examples, the handling of the data traffic may also be differentiated with respect to charging, i.e., one traffic class could be charged in a different manner than another. Typically, traffic classification rules, e.g. packet classification rules, are defined so as to implement the differentiation between different classes of data traffic.

For example, in mobile communication networks data traffic related to a specific service may be directed to a bearer offering a certain QoS level. In this respect, a bearer is considered to be an information transmission context or path of defined characteristics, e.g. capacity, delay and/or bit error rate. Typically, a number of bearers will be established between a gateway of a mobile communication network and a user equipment (UE), e.g. a mobile phone or other type of mobile terminal. A bearer may carry downlink (DL) data traffic in a direction from the network to the user equipment, and may carry data traffic in an uplink (UL) direction from the user equipment to the network. In the gateway and in the user equipment the data traffic, which includes a plurality of IP data packets (IP: "Internet Protocol", which can be the IP Version 4, also referred to as IPv4, or the IP Version 6, also referred to as IPv6) can be filtered, e.g. using IP 5-tuple packet filters, thereby directing the IP data packets to a desired bearer. According to the 3GPP (Third Generation Partnership Project) Technical Specifications (TSs) 23.060 and 24.301, a set of packet filters used to direct the data traffic to a certain bearer is also referred to as a Traffic Flow Template (TFT). In this context, the TFT can be considered as an example of a packet classification rule.

Differentiated handling of data traffic may also be useful in other types of communication network environment, e.g. using fixed access technology such as DSL (Digital Subscriber Line), fibre optical access or coaxial cable access.

Further, it is also desirable to apply differentiated handling to data traffic related to specific network resources. For example, data traffic related to a certain network resource, e.g., to a certain internet service or to a certain content provider, may be known to require a specific QoS level. However, it may in some cases be hard to decide on the basis of the data traffic itself which handling is required. On the other hand, differentiated handling could also be implemented on the basis of known network addresses used by these specific network resources. In this case, however, problems may arise if a large number of specific network resources need to be covered, which in turn may use a variety of different network addresses. Therefore rather complex traffic classification rules would need to be defined in order to take into account a large number of arbitrary network addresses. This may specifically be problematic when considering that in some communication network environments there exist limits on the complexity of the traffic classification rules. For example, the 3GPP TSs limit the maximum number of packet filters which can be installed in a TFT of the UE.

Accordingly, there is a need for techniques which allow for efficient differentiated handling of network traffic related to a specific network resource.

SUMMARY

According to an embodiment of the invention, a method differentiated handling of data traffic is provided. The data traffic is related to a network resource and is preceded by a lookup procedure for obtaining a network address of the network resource. According to the method, a message of the lookup procedure is processed for adapting the lookup procedure. Due to the adaptation, the lookup procedure returns a network address of a replacement network resource. The replacement network resource is capable of replacing the network resource in communication of data packets of the data traffic. On the basis of the network address of the replacement network resource, differentiated handling of the data packets in said communication with the replacement network resource is accomplished.

According to a further embodiment of the invention, a network device is provided. The network device is provided with an interface for receiving a message of a lookup procedure for obtaining a network address of a network resource. Further, the network device is provided with a processor. The processor is configured to process the received message so as to adapt the lookup procedure to return a network address of a replacement network resource. The replacement network resource is capable of replacing the network resource in communication of data packets. On the basis of the network address of the replacement network resource, differentiated handling of the data packets in said communication with the replacement network resource is accomplished.

According to a further embodiment of the invention, a network system is provided. The network system is provided with a replacement network resource, a network device, and at least one communication device. The replacement network resource is capable of replacing a network resource in communication of data packets. The network device is configured to process a message of a lookup procedure for obtaining a network address of the network resource. By this processing the lookup procedure is adapted to return a network address of the replacement network resource. The least one communication device is configured to accomplish differentiated handling of the data packets in said communication with the replacement network resource on the basis of the network address of the replacement network resource.

According to further embodiments, other methods, devices, or computer program products for implementing the methods may be provided.

DETAILED DESCRIPTION OF EMBODIMENTS

Figure 1:
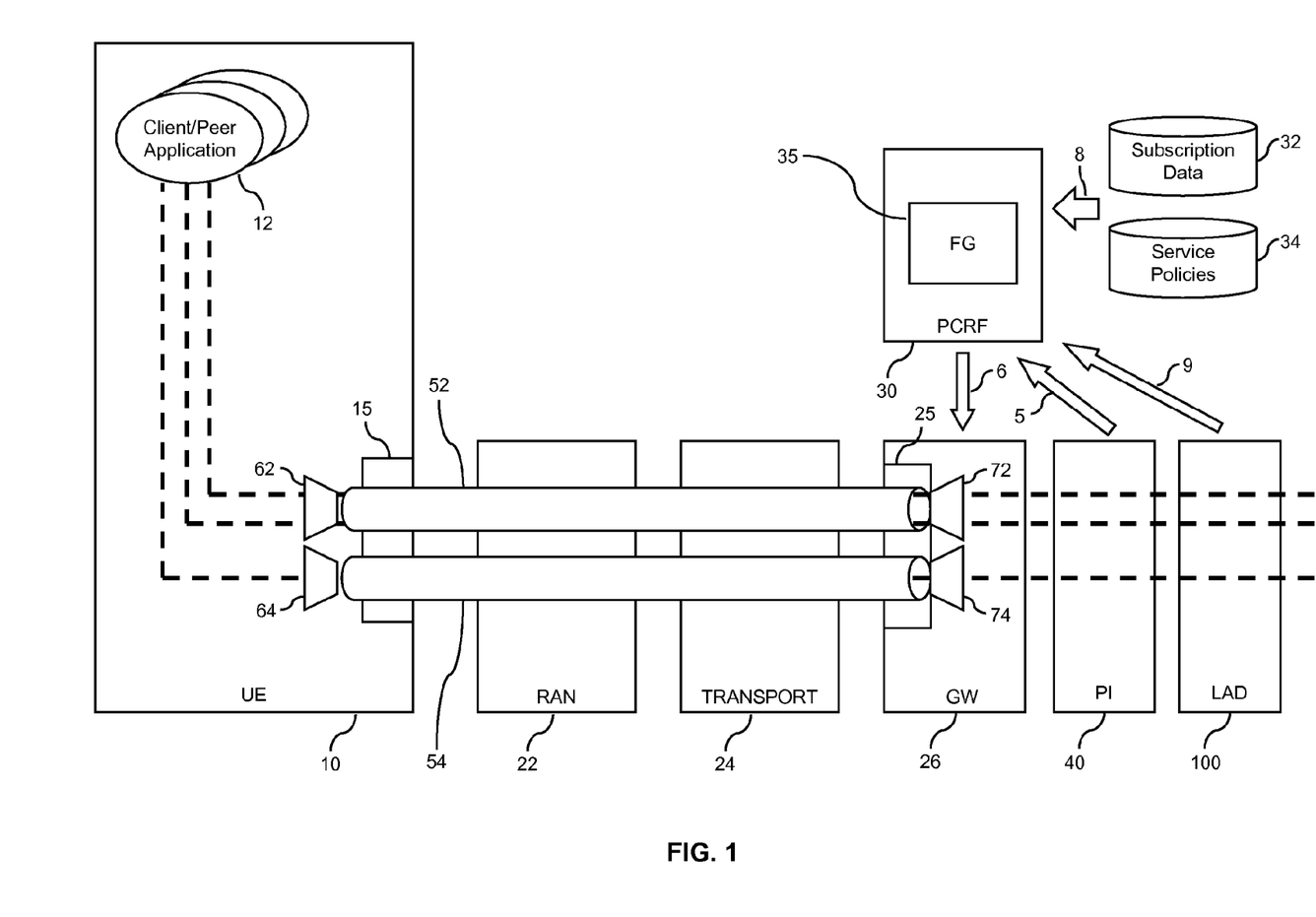
FIG. 1 schematically illustrates a communication network environment in which concepts according to embodiments of the invention are implemented.

In the following, the invention will be explained in more detail by referring to exemplary embodiments and to the accompanying drawings. The illustrated embodiments relate to concepts for differentiated handling of network traffic. As illustrated in FIG. 1, the concepts are applied in a mobile communication network according to the 3GPP TSs. However, it is to be understood that the illustrated concepts may be applied in other types of communication network as well, e.g. using fixed access technology such as DSL, fiber optical access, or coaxial cable access.

FIG. 1 schematically illustrates a communication network environment in which concepts according to embodiments of the invention the invention can be applied.

The communication network environment includes a UE 10, which may also be referred to as a terminal, and a number of network components 22, 24, 26, 30. Among these network components there is a Radio Access Network (RAN) 22. The RAN 22 is based on a certain type or certain types of radio access technology, e.g. GSM (Global System for Mobile Communications), EDGE (Enhanced Data Rate for GSM Evolution), UMTS (Universal Mobile Telecommunications System), Wideband Code Division Multiple Access (WCDMA), or LTE (Long Term Evolution). Although the RAN 22 is illustrated as a single node, it is to be understood that the RAN 22 may actually be formed of a number of components, which are not further explained herein. The RAN 22 is coupled to a transport node 24, which in turn is coupled to a gateway (GW) 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services to one or more external packet data networks. The gateway 26 may also be a System Architecture Evolution Gateway (SAE GW) according to the 3GPP TSs.

In addition, the mobile communication network includes a policy controller 30, which is implemented as a Policy and Charging Rules Function (PCRF) according to the 3GPP TSs. The policy controller 30 may be implemented by dedicated hardware and/or comprise software functions executed by a processor. The gateway 26 and the policy controller 30 are typically regarded as components of a core network. The policy controller 30 communicates with the gateway 26 via a signaling path 6, which may be implemented using the Gx interface according to the 3GPP TSs. The policy controller 30 may be further coupled to a subscriber database 32, e.g., a Home Location Register (HLR) or a Home Subscriber server (HSS) according to the 3GPP TSs, and to a service policy database 34 via a signaling path 8, e.g., implemented using a Sp interface according to the 3GPP TSs. The policy controller 30 may thus receive policy data relating to a specific user and/or relating to a specific service available in the mobile communication network, e.g. mobile TV. The policy controller 30 may further communicate with other network functions using a control signaling path 5, which may be implemented using the Rx interface according to the 3GPP TSs.

Among other functions, the policy controller 30 may comprise a filter generator 35. The filter generator 35 is adapted to specify packet filters to be used in the UE 10 and the gateway 26, which may be accomplished on the basis of subscription data from the subscription database 32, service policies from the service policy database 34, and control data received via the signaling path 5. The packet filters are an example of packet classification rules, which in the illustrated example are used to provide different QoS service levels depending on the traffic class. In other examples, packet filters or other packet classification rules could be used to differentiate between different ways of charging, to selectively block certain traffic classes, which may also be referred to as gating, or to selectively redirect certain traffic classes.

As further illustrated, data traffic between the network and the user equipment 10 is carried by a number of bearers 52, 54 established across a radio interface between the UE 10 and the RAN 22. The data traffic typically pertains to one or more client/peer applications 12 running on the UE 10, and may be related to certain network resources, e.g., internet services or content providers. The bearers 52, 54 are established between the user equipment 10 and the gateway 26. The bearers 52, 54 carry data traffic in both the DL and the UL direction, i.e. may also be regarded as being formed of a DL bearer and a UL bearer. For supporting bidirectional communication on the bearers 52, 54, the UE 10 is provided with a corresponding interface 15 which allows for receiving incoming data packets from the bearers 52, 54 and sending outgoing data packets on the bearers 52, 54. Similarly, the gateway 26 is provided with a corresponding interface 25 which allows for receiving incoming data packets from the bearers 52, 54 and sending outgoing data packets on the bearers 52, 54. The bearers 52, 54 may include a default bearer 52 generally established for offering packet-based services to the user equipment 10 and one or more dedicated bearer 54 which may have different QoS level, e.g. a higher or lower QoS level, than the default bearer. The default bearer 52 is typically established when the UE 10 attaches to the gateway 26 and receives its IP address and IP connectivity. The dedicated bearer 54 is typically established on demand, e.g. when data packets requiring a certain QoS level need to transmitted. However, in some embodiments dedicated bearers may also established in advance, e.g., when the UE 10 attaches to the gateway 26. Each bearer 52, 54 may be associated with a corresponding QoS profile. The QoS profile may be defined through parameters such as a QoS Class Identifier (QCI), an Allocation/Retention Priority (ARP), a Traffic Handling Priority (THP), a Maximum Bit Rate (MBR), an Aggregate Maximum Bit Rate (AMBR), and/or a Guaranteed Bit Rate (GBR). Accordingly, a certain QoS level may be provided for communicating data packets between the UE 10 and the gateway 26 by assigning the data packets to a corresponding one of the bearers 52, 54.

In the UE 10, the data packets are routed to a desired bearer 52, 54 using correspondingly configured packet classification rules in the form of UL packet filters 62, 64. In the gateway 26, the data packets are routed to the desired bearers 52, 54 using correspondingly configured packet classification rules in the form of DL packet filters 72, 74. In accordance with the illustrated 3GPP scenario, a set of filters 62, 64, 72, 74 which operates to direct the data packets to a corresponding bearer may also be referred to as a TFT. Parameters of the QoS profile may be signaled from the policy controller 30 to the gateway 26 using the signaling path 6. Similarly, the DL packet filters 72, 74 to be used in the gateway 26 may be signaled from the policy controller 30 to the gateway 26 via the signaling path 6. As regards the UL packet filters 62, 64 used in the UE 10, these may be signaled from the policy controller 30 via the gateway 26. In some embodiments, at least some of the UL packet filters 62, 64 may be preconfigured in the UE 10 and/or some of the DL packet filters may be preconfigured in the gateway 26. Also, in some embodiments the UL packet filters could be preconfigured in the gateway 26 and be signaled to the UE 10 when it attaches to the gateway 26 or when the corresponding bearer 52, 54 is established. In such embodiments using preconfigured packet filters in the UE 10 and/or in the gateway 26, the policy controller 30 and/or the filter generator 35 of the policy controller 30 could be omitted. In some embodiments, the UL and/or DL packet filters could also be preconfigured in the policy controller 30 and be signaled to the gateway 26 and/or to the UE 10, e.g., when the UE 10 attaches to the gateway 26 or when the corresponding bearer 52, 54 is established.

In the following, concepts according to embodiments of the invention will be explained, which allow for efficiently subjecting the data traffic related to one or more specific network resources to differentiated handling. In this respect, the term "network resource" is intended to cover various types of structures, content, or services which are accessible in the network. In some example, the network resource may be a server on which the service or content is hosted, e.g., under a Uniform Resource Identifier (URI) or Uniform Resource Identifier. In some scenarios, the same server may host different network resources. In the example of FIG. 1, these concepts are applied with respect providing a certain QoS level, which is achieved by routing the data packets to the bearers 52, 54 using the packet filters 62, 64, 72, 74 in the UE 10 and in the gateway 26. However, it is to be understood that these concepts could also be applied to other types of differentiation, e.g., with respect to charging, with respect to selective blocking of the data traffic, which is also referred to as redirection, or with respect to selective redirection of the data traffic.

The differentiated handling is accomplished on the basis of packet classification rules, which are applied by one or more communication devices, which in the example of FIG. 1 are the UE 10 and the gateway 26. In the example of FIG. 1, packet classification rules are implemented by the packet filters 62, 64, 72, 74. The packet filters 62, 64, 72, 74 are generally configured to operate on the basis of network addresses, which are included in a respective protocol header of the data packets. The network addresses may in particular be IP addresses. For example, when using the Transport Control Protocol (TCP) or the User Datagram Protocol (UDP) for implementing transport of data via the data packets, the protocol header will include IP addresses defining a source network address and a destination network address of the data packet, which can be used separately or in combination as a basis for matching a filter pattern defined in the packet filter 62, 64, 72, 74. Moreover, the above examples of a protocol header will also define a source port number and a destination port number, which can be used separately or in combination as a basis for matching a filter pattern defined in the packet filter 62, 64, 72, 74. In some embodiments, the packet filters 62, 64, 72, 74 may operate on the basis of a pattern for matching an IP 5 tuple (source IP address, destination IP address, source port number, destination port number, protocol ID of the protocol above IP) of the data packets. Further, the packet filters may operate on a filter pattern in which an IP address is be combined with a prefix mask, and/or port numbers are be specified as port ranges. The filter pattern can also be extended by the Type of Service (TOS) (IPv4)/Traffic class (IPv6) and Mask. The filter pattern can also consist of the destination IP address, protocol ID of the protocol above IP, the Type of Service (TOS) (IP Version 4)/Traffic class (IP Version 6) and Mask and the IPSec Security Parameter Index (SPI). The filter pattern can also consist of the destination IP address, the Type of Service (TOS) (IPv4)/Traffic class (IPv6) and Mask and the Flow Label (IPv6). In some embodiments, a value left unspecified in the filter pattern packet filter 62, 64, 72, 74 may match any value of the corresponding information in the data packet, i.e. wildcards may be defined.

In order to reduce complexity of the packet classification rules needed to implement the desired differentiated handling, e.g., of the packet filters 62, 64, 72, 74, the concepts according to embodiments of the invention as explained in the following are based on an adaptation of lookup procedures for obtaining network addresses of the specific network resources for which differentiated handling is implemented. This adaptation is accomplished by processing one or more messages of the lookup procedure. This processing may involve receiving a query for the network address of the network resource and responding to the query with the network address of the replacement network resource. Further, this processing may involve receiving a response to a query for the network address of the network resource and modifying the response by replacing the network address of the network resource with the network address of the replacement network resource. Further, this processing may also involve redirecting a query for the network address of the network resource. In the illustrated examples, the lookup procedures are based on the Domain Name System (DNS), and the adaptation is accomplished by processing one or more DNS messages, e.g., a DNS query or a response to a DNS query. In other examples, other lookup procedures could be used as well, e.g., a NetBIOS lookup procedure.

More specifically, the illustrated concepts apply to scenarios in which data traffic related to a specific network resource is preceded by a lookup procedure for obtaining a network address of this network resource. The lookup procedure is adapted by processing of one or more messages of the lookup procedure in such a way that the lookup procedure returns a network address of a replacement network resource capable of replacing the network resource in communication of data packets. For example, the replacement network resource may be configured with this capability by operating as a proxy node with respect to the network resource. The replacement network resource may also cache content provided by the network resource. In some embodiments, the replacement network resource may be a cache server or a tunnel edge server for delivering the content of the network resource.

The communication of data packets may then be established with respect to the replacement network resource, and differentiated handling of the data packets may be accomplished on the basis of the network address of the replacement network resource. Accordingly, the differentiated handling of the data packets can be facilitated by suitably selecting the network address of the replacement network resource. For this purpose, the replacement network resource may be located in the same local network as communication device, e.g., the UE 10, to which the communication is established. A network operator of the local network may therefore suitably assign the network address to the replacement network resource. For example, the network address may be selected from a private network address range, e.g., as defined in RFC 1918, RFC 4193, or RFC 5735. However, the network address could also be selected from a specific range of public network addresses, e.g., allocated to the network operator.

For example, the network address of the replacement network resource may be selected from a network address range corresponding to a subnet. In this case, the packet classification rule operating on the basis of this network address may be provided with a simple structure. For example, the filter pattern as used by one or more of the packet filters 62, 64, 72, 74 may define the network address to be matched by using a wildcard, thereby achieving that every network address within this subnet will match the filter pattern. As can be seen, it is therefore possible to efficiently define a packet classification rule to provide the same handling for all network addresses from this subnet. This could be used to provide a specific handling for a number of specific network resources by assigning the replacement network resources for these network resources network addresses from the same subnet. According to a further example, also differentiation between the data traffic of different network resources can be implemented by selecting the network addresses of the corresponding replacement network resources each from a different network range corresponding to a subnet. A corresponding packet classification rule may be defined for each subnet, thereby allowing to individually define a corresponding handling of the related data traffic. Accordingly, in some embodiments the network address of the replacement network address can be selected in accordance with a traffic class of the data traffic related to the network resource. In particular, each traffic class may be assigned to a corresponding network address range, e.g., a subnet, and the network address of the replacement network resource may be selected from the network address range corresponding to the traffic class of the data traffic related to the network resource.

In order to implement the above concepts, the communication system of FIG. 1 further includes a lookup adaptation device (LAD) 100. Typically, the lookup adaptation device 100 will receive lookup messages pertaining to the data traffic related to the specific network resource. In some embodiments, the lookup adaptation device 100 may be arranged in such a way that lookup messages pertaining to the data traffic of the UE 10 are routed through the lookup adaptation device 100. For example, this could be accomplished by arranging the lookup adaptation device 100 in a data path between the gateway 26 and a local DNS server (not illustrated in FIG. 1). In some embodiments the lookup adaptation device 100 may be part of the gateway 26. In some embodiments, the lookup adaptation device 100 could also be part of the local DNS server. According to still further embodiments, the lookup adaptation device could also be arranged in a data path between the local DNS server and an external DNS server. Further, in some embodiments the lookup adaptation device 100 may also be part of an external DNS server. The lookup adaptation device 100 may be implemented within other network devices, e.g., the gateway 26 or the local DNS server, or as a standalone network device. The functionalities of the lookup adaptation device 100 may be implemented by software by having a processor (not illustrated in FIG. 1) of the lookup adaptation device 100 execute suitably configured program code and use suitably configured lookup adaptation data. As an alternative, the lookup adaptation device 100 may at least in part be implemented by dedicated hardware.

In some embodiments, the network address of the replacement network resource may be selected in such a way that it matches a preconfigured packet classification rule operating on the basis of this network address. In this way, no individual procedures for generating and/or signaling the packet classification rules are necessary. For example, in the mobile communication network environment of FIG. 1, the packet filters 62, 64 could be preconfigured in the UE 10, and/or the packet filters 72, 74 could be preconfigured in the gateway 26. Also, the packet filters 62, 64 could be preconfigured in the gateway 26 and then signaled to the UE 10. Further, the packet filters 62, 64, 72, 74 could be preconfigured in the policy controller 30 and the be signaled to the gateway 26 and/or to the UE 10. The preconfiguration could be obtained, e.g., by providing the packet classification rules together with an operating software of the communication device which is to perform differentiated handling on the basis of these packet classification rules, or by using maintenance procedures to provide the packet classification rules to the communication device. In some embodiments such preconfigured packet classification rules may be updated in response to inspecting the data packets, thereby allowing for a refined differentiation, e.g., between different classes of data traffic related to the same network resource or between data traffic related to different network resources using the same replacement network resource.

In some embodiments, a packet classification rule operating on the basis of the network address of the replacement network resource may also be dynamically generated in response to selecting the network address of the replacement network resource, or an existing packet classification rule may be modified in response to selecting the network address of the replacement network resource. In the example of FIG. 1, the lookup adaptation device may use a signaling path 9 to the policy controller 30 to initiate generation of new packet filters to be used by the UE 10 and/or by the gateway 26 or to initiate modification of the existing packet filters 62, 64, 72, 74, which in each case may be accomplished by the filter generator 35 of the policy controller 30.

As further illustrated, the communication system of FIG. 1 also includes a packet inspector 40. In some embodiments, the packet inspector 40 is used to further differentiate between traffic classes within data traffic related to the same network resource, e.g., different applications of the same internet service or different types of content from the same content provider. As an alternative or in addition, the packet inspector 40 may also be used to differentiate between data traffic related to different network resources using the same replacement network resource.

The packet inspector 40 is operable to determine a traffic class of data packets in the UL or DL traffic. For this purpose, the packet inspector 40 may analyze data packets of the UL or DL traffic, e.g., with respect to information going beyond the protocol header of the data packets. For example, the packet inspector 40 could analyze the data packets with respect to Hostnames, Uniform Resource Identifiers (URIs), Uniform Resource Locators (URLs), or network addresses included in a payload section of the data packets. For example, such information may be found in HTTP requests, e.g., in a request header of a HTTP request. Information obtained by the packet inspector 40 can then be used to update the packet classification rules, e.g., one or more of the packet filters 62, 64, 72, 74. In the example of FIG. 1, the update may be initiated by the packet inspector 40 using the signaling path 5 to the policy controller 30. The filter generator 35 of the policy controller 30 may then generate updated filters to be used in the gateway 26 and/or in the UE 10.

Figure 2:
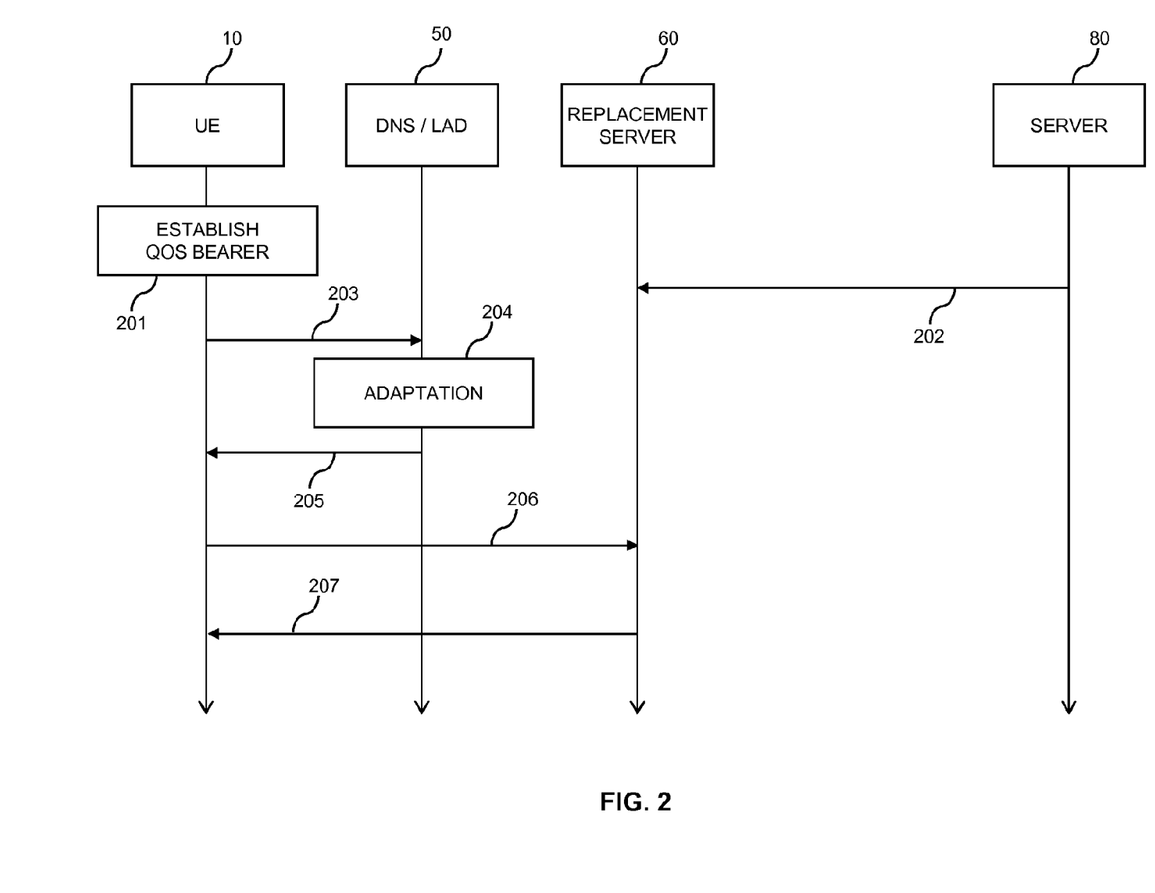
FIG. 2 shows a signaling diagram for illustrating an exemplary scenario in which differentiated handling of data traffic according to an embodiment of the invention can be applied.

FIG. 2 shows a signaling diagram for illustrating an exemplary scenario in which differentiated handling of data traffic is provided by adapting a lookup procedure in accordance with the above concepts. The signaling diagram of FIG. 2 shows the UE 10, a local DNS server 50, a replacement server 60, and a server 80. The above-described functionality of the lookup adaptation device is implemented within the local DNS server 50. That is to say, the lookup adaptation device 100 of FIG. 1 may be part of the local DNS server 50.

In the scenario of FIG. 2, the server 80 represents an example of a specific network resource for which the related data traffic is to be subjected to differentiated handling in communication with respect to the UE 10. For example, the server 80 may provide one or more specific internet service or may be part of a content delivery system used for efficient delivery of content. As explained in connection with FIG. 1, this differentiated handling may have the purpose of providing a certain QoS level for the data traffic, which can be obtained by routing data packets of this data traffic to a corresponding bearer, e.g., one of the bearers 52, 54, in particular the dedicated bearer 54. The replacement server 60 functions as a replacement network resource for the server 80. The replacement server 60 is capable of replacing the server 80 in communication with the UE 10. In particular, the replacement server 60 is capable of responding to requests from the UE 10 in the same way as the server 80. For this purpose, the replacement server 60 may operate a proxy node with respect to the server 80, e.g., by relaying the requests to the server 80 and forwarding responses from the server 80 to the UE 10, and/or may cache content provided by the server 80. In some cases, an acceleration tunnel may be provided for communication between the replacement server 60 and the server 80. In such cases, the replacement server may function as tunnel edge server and accomplish, e.g., encapsulation of data packets to be transmitted via the acceleration tunnel to the server 80 and decapsulation of data packets received via the acceleration tunnel from the server 80. In some embodiments, proxy node operation, cache server operation, and tunnel edge server operation of the replacement server 60 may be combined.

Moreover, it is assumed that the UE 10 is attached to a mobile communication network using radio access technology, e.g., as illustrated in FIG. 1, and that the local DNS server 50 and the replacement server 60 are part of this mobile communication network, i.e., controlled by the same network operator. The network operator may have allocated a certain range of network addresses to be used by replacement network resources, e.g., a range of private network addresses, and the replacement server 60 has a network address which is selected from this range.

At step 201, a bearer to be used by the data traffic related to the server 80 is established, e.g., the dedicated bearer 54. The bearer may be established to offer a certain QoS level, thereby allowing to treat the data traffic, e.g., as premium traffic or trash traffic. The bearer may already be established when the UE 10 attaches to the mobile communication network.

Alternatively, the bearer could also be established in response to first detecting the data traffic related to the server 80, e.g., using the packet inspector 40. The packet filters to be used for routing the data traffic to the bearer are configured to operate on the basis of the network address assigned to the replacement server 60. In particular, the UL packet filters to be used in the UE 10 are configured to route UL data packets directed to the network address of the replacement server to the bearer, and the DL packet filters to be used in the gateway to which the UE 10 is attached, e.g., the gateway 26 of FIG. 1, are configured to route DL data packets coming from the network address of the replacement server to the bearer. The packet filters may be preconfigured in the UE 10 or in the gateway, and the network address of the replacement server 60 may be selected to match these preconfigured packet filters. Alternatively, the packet filters could be generated in response to selecting the network address of the replacement server. In each case, the signaling needed to establish the bearer is limited. Moreover, network addresses of other replacement servers corresponding to other servers could be assigned in such a way that a simple filter structure is obtained.

As illustrated at 202, the server 80 transmits data to the replacement server 60. Depending on the operation of the replacement server 60, this may be accomplished at any suitable time. For example, the transmission could be triggered by new data becoming available at the server 80 or by a request for the data by another client. Such a request could be first received by the replacement server 60 which, if the data is not locally available, then forwards the request to the server 80. The replacement server 60 may then store the received data so as to be used for responding to subsequent requests. In proxy node operation, e.g., as a tunnel edge server, the transmission of the data from the server 80 to the replacement server 60 is triggered by the requests of the UE 10 which are relayed by the replacement server 60 to the server 80.

When the UE 10 now needs to access the server 80, it first issues a DNS query 203 to the local DNS server 50. The DNS query 203 specifies a hostname or URI associated with the server 80 to request the network address of the server 80. The local DNS server 50, which includes the lookup adaptation functionality, then performs an adaptation step 204 before responding to the DNS query with a message 205. The adaptation step 204 causes the DNS query 203 to be processed in such a way that the message 205 indicates the network address of the replacement server 60. The adaptation step 204 therefore causes the lookup procedure to return the network address of the replacement server 60. The adaptation step 204 may be implemented by corresponding configuration of resource records as stored by the local DNS server 50 for the hostname or URI associated with the server 80. The configuration of the resource records may be based on suitably configured lookup adaptation data relating the hostname and/or URI associated with the server 80 to the network address of the replacement server 60.

The UE 10 then sends a request 206 to the replacement server to request the data, and the replacement server 60 sends a response 207 with the requested data to the UE 10. The data packets of the request 206 will indicate the network address of the replacement server 60 as their destination address and therefore be directed to the bearer established at step 201 by the UL packet filters of the UE 10. Similarly, the data packets of the response 207 will indicate the network address of the replacement server 60 as their destination address and therefore be directed to the bearer established at step 201 by the DL packet filters of the gateway to which the UE 10 is attached.

For subsequent data traffic related to the server 80, no new DNS query by the UE 10 is needed as long as the network address of the replacement server 60 is cached by the UE 10. Such traffic would directly be routed to the replacement server 60.

It is to be understood that the lookup procedure of FIG. 2 could be modified in various manners. For example, the DNS query 203 could be redirected by the local DNS server 50 to an external DNS server, e.g., to a DNS server which is authoritative for the domain of the server 80. This redirection could be in one ore more steps. The adaptation of step 204 could then also be accomplished by the external DNS server. This external DNS server may however be hosted by the network operator of the mobile communication network. In such cases, the lookup procedure could also include further steps to optimize the delivery of content, e.g., steps for selecting cache clusters or cache servers.

In some scenarios, the lookup procedure of FIG. 2 may also be iterative. In such scenarios, the local DNS server 50 may respond to the UE 10 with a message indicating a further DNS server to which the DNS query should be sent in the next step. The UE 10 then sends the DNS query to the further DNS server to obtain the requested network address, or information on a still further DNS server to which the DNS query is to be sent in the next step. This may be iterated until the DNS query arrives at a DNS server which responds to the DNS query with the network address of the replacement server 60. This DNS server, which sends the final response to the query, may be an external DNS server, e.g., a DNS server which is authoritative for the domain of the server 80. However, this external DNS server may be hosted by the network operator of the mobile communication network.

Also, the message 205 returned to the UE 10 could indicate not only the network address of the replacement server 60, but also additional network addresses associated with the replacement server or further replacement servers. To these further replacement servers, the corresponding network addresses may be assigned in such a way that they match the packet filters of the bearer established at step 201. Further, the DNS query 203 and the message 205 returned to the UE in response to the DNS query 203 could be routed to the bearer established at step 201 by generating the packet filters of the bearer to match all data packets indicating port number 53 as source or destination port.

Figure 3:
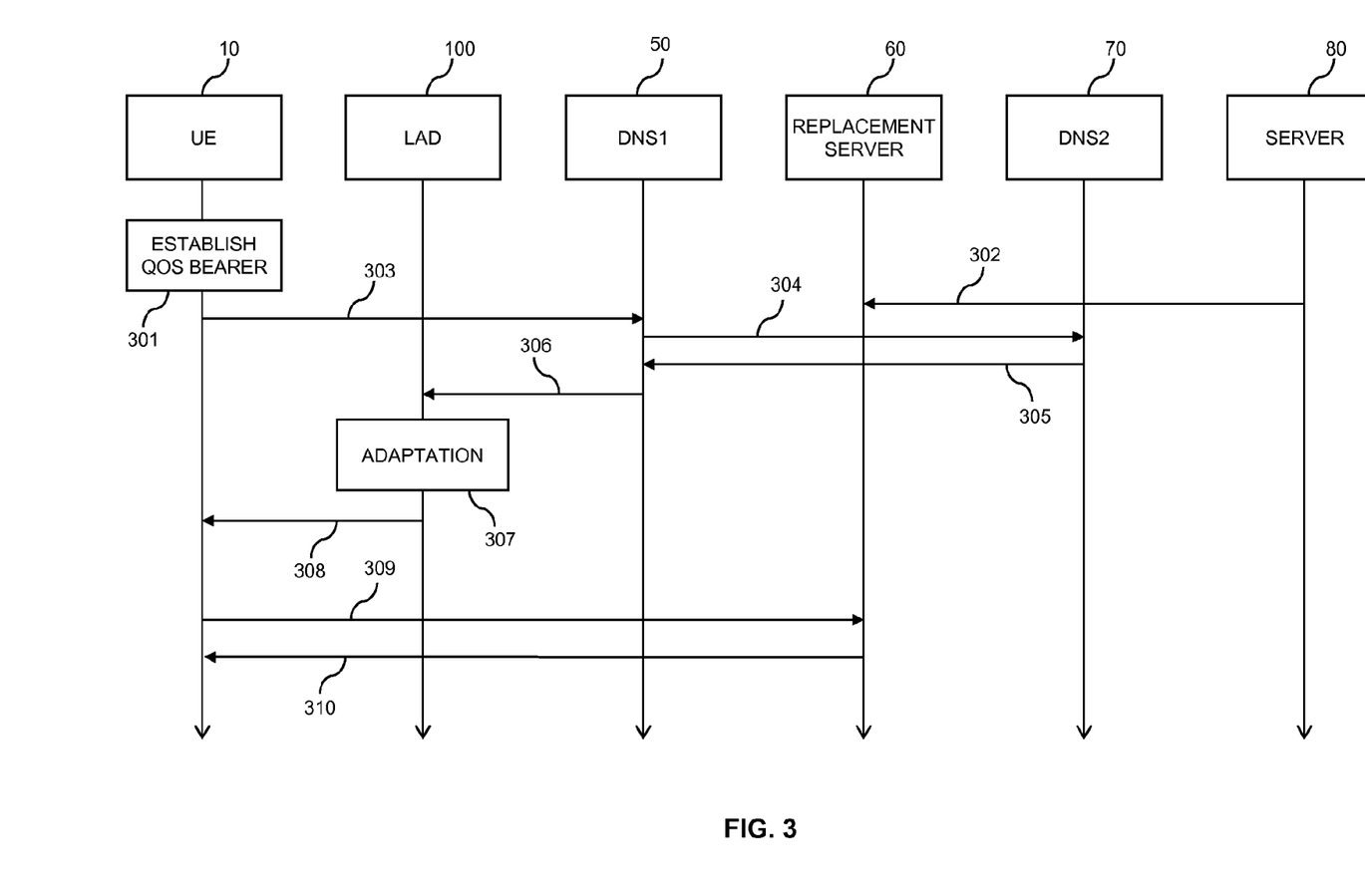
FIG. 3 shows a signaling diagram for illustrating a further exemplary scenario in which differentiated handling of data traffic according to an embodiment of the invention can be applied.

FIG. 3 shows a signaling diagram for illustrating a further exemplary scenario in which differentiated handling of data traffic is provided by adapting a lookup procedure in accordance with the above concepts. In this scenario, the adaptation is based on an interception of a message transmitted in response to a DNS query. The signaling diagram of FIG. 3 shows the UE 10, the lookup adaptation device 100, a local DNS server 50, a replacement server 60, an external DNS server, and a server 80. The lookup adaptation device 100 is illustrated to be arranged between the UE 10 and the local DNS server 50. For example, the lookup adaptation device 100 could be implemented within or collocated with the gateway to which the UE 10 is attached, e.g., the gateway 26 of FIG. 1.

In the scenario of FIG. 3, the server 80 represents an example of a specific network resource for which the related data traffic is to be subjected to differentiated handling in communication with respect to the UE 10. For example, the server 80 may provide one or more specific internet service or may be part of a content delivery system used for efficient delivery of content. As explained in connection with FIG. 1, this differentiated handling may have the purpose of providing a certain QoS level for the data traffic, which can be obtained by routing data packets of this data traffic to a corresponding bearer, e.g., one of the bearers 52, 54, in particular the dedicated bearer 54. The replacement server 60 functions as a replacement network resource for the server 80. The replacement server 60 is capable of replacing the server 80 in communication with the UE 10. In particular, the replacement server 60 is capable of responding to requests from the UE 10 in the same way as the server 80. For this purpose, the replacement server 60 may operate a proxy node with respect to the server 80, e.g., by relaying the requests to the server 80 and forwarding responses from the server 80 to the UE 10, and/or may cache content provided by the server 80. In some cases, an acceleration tunnel may be provided for communication between the replacement server 60 and the server 80. In such cases, the replacement server may function as tunnel edge server and accomplish, e.g., encapsulation of data packets to be transmitted via the acceleration tunnel to the server 80 and decapsulation of data packets received via the acceleration tunnel from the server 80. In some embodiments, proxy node operation, cache server operation, and tunnel edge server operation of the replacement server 60 may be combined.

Moreover, it is assumed that the UE 10 is attached to a mobile communication network using radio access technology, e.g., as illustrated in FIG. 1, and that the local DNS server 50 and the replacement server 60 are part of this mobile communication network, i.e., controlled by the same network operator. The network operator may have allocated a certain range of network addresses to be used by replacement network resources, e.g., a range of private network addresses, and the replacement server 60 has a network address which is selected from this range. The external DNS server 70 may be, e.g., a DNS server which is authoritative for the domain of the server 80.

At step 301, a bearer to be used by the data traffic related to the server 80 is established, e.g., the dedicated bearer 54. The bearer may be established to offer a certain QoS level, thereby allowing to treat the data traffic, e.g., as premium traffic or trash traffic. The bearer may already be established when the UE 10 attaches to the mobile communication network. Alternatively, this the bearer could also be established in response to first detecting the data traffic related to the server 80, e.g., using the packet inspector 40. The packet filters to be used for routing the data traffic to the bearer are configured to operate on the basis of the network address assigned to the replacement server 60. In particular, the UL packet filters to be used in the UE 10 are configured to route UL data packets directed to the network address of the replacement server to the bearer, and the DL packet filters to be used in the gateway to which the UE 10 is attached, e.g., the gateway 26 of FIG. 1, are configured to route DL data packets coming from the network address of the replacement server to the bearer. The packet filters may be preconfigured in the UE 10 or in the gateway, and the network address of the replacement server 60 may be selected to match these preconfigured packet filters. Alternatively, the packet filters could be generated in response to selecting the network address of the replacement server. In each case, the signaling needed to establish the bearer is limited. Moreover, other network addresses of other replacement servers corresponding to other servers could be assigned in such a way that a simple filter structure is obtained.

As illustrated at 302, the server 80 transmits data to the replacement server 60. Depending on the operation of the replacement server 60, this may be accomplished at any suitable time. For example, the transmission could be triggered by new data becoming available at the server 80 or by a request for the data by another client. Such a request could be first received by the replacement server 60 which, if the data is not locally available, then forwards the request to the server 80. The replacement server 60 may then store the received data so as to be used for responding to subsequent requests. In proxy node operation, e.g., as a tunnel edge server, the transmission of the data from the server 80 to the replacement server 60 is triggered by the requests of the UE 10 which are relayed by the replacement server 60 to the server 80.

When the UE 10 now needs to access the server 80, it first issues a DNS query 303 to the local DNS server 50. The DNS query 303 specifies a hostname or URI associated with the server 80 to request the network address of the server 80. It now assumed that the local DNS server 50 is not capable of responding to the DNS query 303 and therefore issues a further DNS query 304 to the external DNS server 70. The external DNS server 70 responds to the local DNS server 50 with a message 305 indicating the network address of the server 80. The local DNS server 50 then issues a message 306 indicating the network address of the server 80 toward the UE 10. The message 306 is intercepted by the lookup adaptation device 100 and modified at adaptation step 307 by replacing the network address of the server 80 with the network address of the replacement server 60. The lookup adaptation device 100 then forwards the modified message 308 to the UE 10. The adaptation step 307 causes the lookup procedure to return the network address of the replacement server 60. The adaptation step 307 may be implemented by providing the lookup adaptation device 100 with suitably configured lookup adaptation data relating the network address, hostname, and/or URI associated with the server 80 to the network address of the replacement server 60.

The UE 10 then sends a request 309 to the replacement server 60 to request the data, and the replacement server 60 sends a response 310 with the requested data to the UE 10. The data packets of the request 309 will indicate the network address of the replacement server as their destination address and therefore be directed to the bearer established at step 301 by the UL packet filters of the UE 10. Similarly, the data packets of the response 310 will indicate the network address of the replacement server as their destination address and therefore be directed to the bearer established at step 301 by the DL packet filters of the gateway to which the UE 10 is attached.

For subsequent data traffic related to the server 80, no new DNS query by the UE 10 is needed as long as the network address of the replacement server 60 is cached by the UE 10. Such traffic would directly be routed to the replacement server 60.

It is to be understood that the lookup procedure of FIG. 3 could be modified in various manners. For example, the redirection of the DNS query to the external DNS server could include one or more further redirection processes. Further, the lookup procedure could also include further steps to optimize the delivery of content, e.g., steps for selecting cache clusters or cache servers. Also, the lookup adaptation device 100 could intercept a response to a DNS query at a different position. For example, the lookup adaptation device 100 could be arranged between the local DNS server 50 and the external DNS server 70 and intercept the message 305.

In some scenarios, the lookup procedure of FIG. 3 may also be iterative. In such scenarios, the local DNS server 50 may respond to the UE 10 with a message indicating a further DNS server to which the DNS query should be sent in the next step. The UE 10 then sends the DNS query to the further DNS server to obtain the requested network address, or information on a still further DNS server to which the DNS query is to be sent in the next step. This may be iterated until the DNS query arrives at a DNS server which responds to the DNS query with the network address of server 80. This final response would then be intercepted by the lookup adaptation device 100 and modified as explained for adaptation step 307.

Also, the message 308 returned to the UE 10 could indicate not only the network address of the replacement server 60, but also additional network addresses associated with the replacement server or further replacement servers. To these further replacement servers, network addresses may be assigned which match the packet filters of the bearer established at step 301. Further, the DNS query 303 and the message 308 returned to the UE in response to the DNS query 303 could be routed to the bearer established at step 301 by generating the packet filters of the bearer to match all data packets indicating port number 53 as source or destination port.

In the scenarios of FIGS. 2 and 3, the step of establishing the bearer can depend on further conditions. For example, the bearer could be established only for certain types of UE, e.g., on the basis of an International Mobile Equipment Identity (IMEI) of the UE 10. Further, the bearer could be established only for certain subscribers, e.g., based on information in the subscriber database 32 of FIG. 1. Further, the bearer could be established only in certain parts of the network, e.g., based on the location of the UE 10. Further, the bearer could be established only for certain radio access technologies the UE 10 uses for attaching to the mobile communication network, e.g., on the basis of the type of the RAN 22 in FIG. 1. If the bearer is not established, the data traffic may be handled in the usual manner, e.g., be routed to the default bearer 52.

In the above described concepts, differentiated handling can be implemented in a variety of ways. For example, data traffic related to a plurality of different network resource could be handled in the same way by providing a corresponding replacement network resource for each of the network resources and by selecting the network addresses of the replacement network resources in such a way that the packet classification rule(s) operating thereon can be provided with a simple structure, e.g., by selecting the network addresses from the same subnet or from a contiguous range of network addresses.

Also, the data traffic related to a first set of network resources could be handled differently from that related to a second set of network resources by providing a corresponding replacement network resources for each of the network resources and by selecting the network addresses of the replacement network resources in such a way that the packet classification rules operating thereon can be provided with a simple structure, e.g., by selecting the network addresses of the replacement network resources corresponding to the first set from different subnets or from different contiguous ranges of network addresses than the network addresses of the replacement network resources corresponding to the second set. Typically different packet classification rules may then be defined for the first and second set. For example, different sets of packet filters could be defined in order to route the data traffic related to the first set to another bearer, e.g., to another dedicated bearer, than the data traffic related to the second set. For example these two bearers could be dedicated bearers having different QoS levels. However, this also includes the possibility of providing no explicit packet classification rule for one set of network resources and corresponding replacement network resources. In the example of FIG. 1, this would cause the data traffic related to this set to be routed to the default bearer.

In some embodiments, the same replacement network resource may be used to provide two or more different ways of handling the data traffic. For example, this can be achieved by assigning two or more network addresses to the same replacement network resource, each of the network addresses being selected from a range associated with a different way of handling the data traffic, e.g., from different subnets. In some embodiments, two or more network addresses of the same replacement network resource can also be used for differentiating between the data traffic respectively related to different network resources which are associated with this same replacement network resource.

Further, it is to be understood that the above concepts may also be applied to differentiated handling with respect to other features than QoS. In some embodiments, the packet classification rules or packet filters could be used to differentiate between the data packets with respect to different ways of charging. For example, for certain content providers or internet services a specific way of charging may be applied such as zero-rating of traffic charges, which means that traffic related to these content providers or internet services should not be counted to the subscribers pre-paid or postpaid account for charging purposes. According to another example, a corresponding rate of charging may be defined for each network resource.

Figure 4:
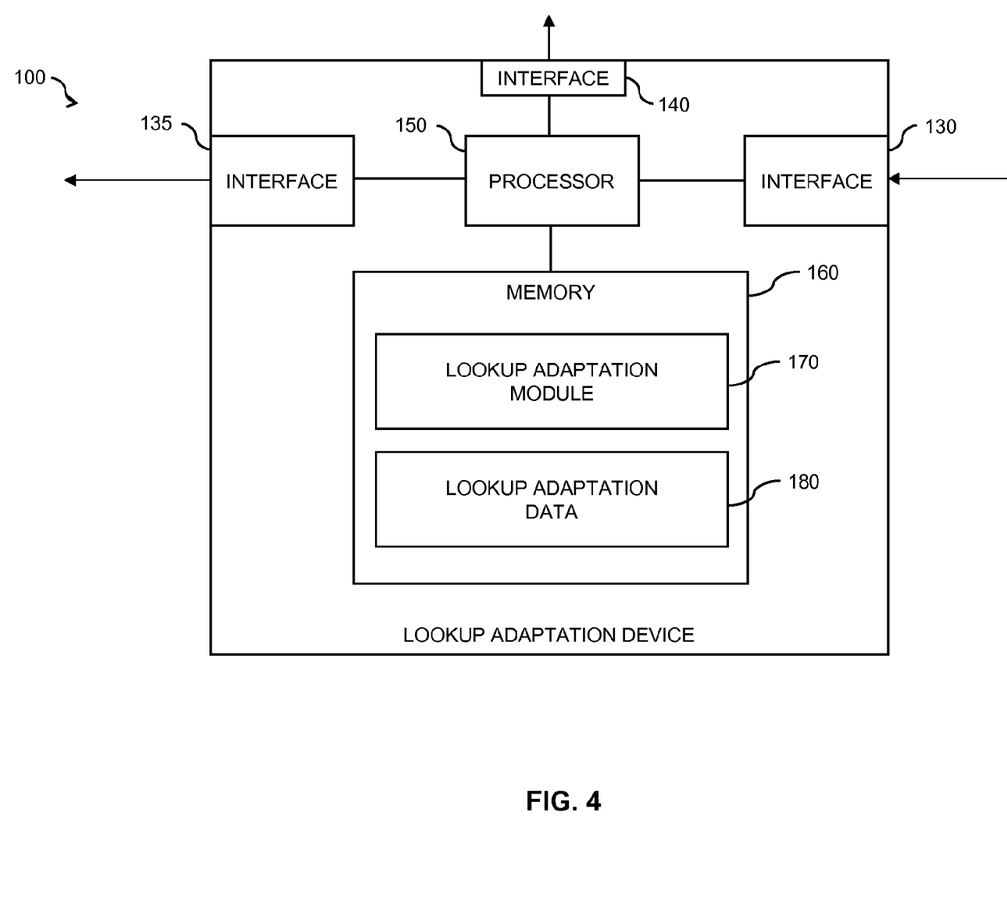
FIG. 4 schematically illustrates a network device according to an embodiment of the invention.

FIG. 4 further schematically illustrates an exemplary structure of a network device for implementing the lookup adaptation device 100.

In the illustrated implementation, the lookup adaptation device 100 includes a first interface 130 configured to receive messages of a lookup procedure, e.g., DNS queries or responses to DNS queries. Further, the lookup adaptation device 100 also includes an second interface 135 configured to transmit messages of a lookup procedure, e.g., to send or forward DNS queries or to send responses to DNS queries. In some embodiments, the first and second interfaces 130, 135 could also be implemented in a single bidirectional interface.

Moreover, the lookup adaptation device 100 may also be provided with a control interface 140, which can be used to provide indications to other entities, e.g., to initiate generation or updating of packet filters by signaling to the policy controller 30 and/or to the gateway 26, and/or to initiate control processes with respect to forwarding procedures of data packets, e.g., modification and/or establishment of the bearers 52, 54. In the illustrated 3GPP scenario, the control interface 140 may be implemented as the Rx interface according to the 3GPP TSs. Further, the interface 140 may also be used to obtain lookup adaptation data and/or or other data from which the lookup adaptation data may be derived. In some embodiments, the control interface 140 may be implemented in a single interface with the first and second interfaces 130, 135.

Further, the lookup adaptation device 100 includes a processor 150 coupled to the interfaces 130, 135, 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 160 includes suitably configured program code to be executed by the processor 150 so as to implement the above-described functionalities of the lookup adaptation device 100. More specifically, the memory 160 may include a lookup adaptation module 170 so as to implement the above-described mechanisms of adapting lookup procedures and lookup adaptation data 180 to be used in the process of adapting the lookup procedure.

It is to be understood that the structure as illustrated in FIG. 4 is merely schematic and that the lookup adaptation device 100 may actually include further components which, for the sake of clarity, have not been illustrated, e.g. further interfaces. Also, it is to be understood that the memory 150 may include further types of program code modules, which have not been illustrated. According to some embodiments, also a computer program product may be provided for implementing concepts according to embodiments of the invention, e.g., a computer-readable medium storing the program code and/or the lookup adaptation data to be stored in the memory 160.

Figure 5:
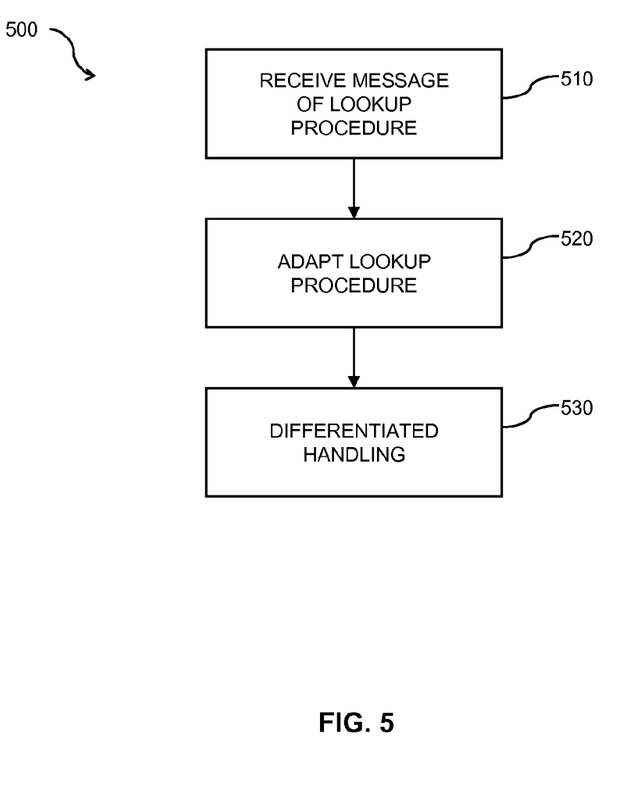
FIG. 5 shows a flowchart for illustrating a method according to an embodiment of the invention.

FIG. 5 shows a flowchart for schematically illustrating a method 500 for differentiated handling of data traffic according to an embodiment of the invention. The method may be used to implement the above described concepts, e.g., in the mobile communication network of FIG. 1 by using the lookup adaptation device 100. In some embodiments, the method 500 may also be used to implement the above concepts by using a network system including the lookup adaptation device, at least one communication device, e.g., the UE 10 and/or the gateway 26, and a replacement network resource, e.g., the replacement server 60. In some embodiments, the network system may include further components, e.g., the packet inspector 40. As explained above, the method 500 is based on the assumption that the data traffic is related to a network resource, e.g., provided an internet service or a content provider, and that the data traffic is preceded by a lookup procedure for obtaining a network address of the network resource.

At step 510, a message of the lookup procedure is received, e.g., using the interface 130 of the lookup adaptation device 100 as illustrated in FIG. 4. The message may be a DNS message, e.g., a DNS query or a response to a DNS query.

At step 520, the message is processed so as to adapt the lookup procedure. Due to the adaptation, the lookup procedure returns a network address of a replacement network resource, e.g., the replacement server 60 which may be a cache server or tunnel edge server. The replacement network resource is capable of replacing the network resource in communication of data packets of the data traffic. For this purpose, the replacement network resource may cache content provided by the network resource and/or operate as a proxy node with respect to the network resource.

At step 530, differentiated handling of the data packets is accomplished on the basis of the network address of the replacement network resource. For this purpose, packet classification rules may be defined, which operate on the basis of the network address of the replacement network resource. For example, in a mobile communication network environment, e.g., as illustrated in FIG. 1, these packet classification rules may be implemented by packet filters in which a filter pattern matching the network address of the replacement network resource is defined. The packet filters may then be used to route the data packets to a bearer offering a desired QoS level. By appropriate selection of the network address of the replacement network resource, e.g., from a range of private IP addresses, a simple structure of the packet classification rules can be achieved. For example, a total range from which the network address of the replacement network can be selected can be organized into subranges corresponding to different traffic classes. The subranges could then correspond to different subnets. With such an organization different scenarios of differentiated handling may be addressed. For example, in the case of different network resources for which the related data traffic is to be handled in the same way, the network addresses of the corresponding replacement network resources can be selected from the same subrange. On the other hand, in the case of different network resources for which the related data traffic is to be handled in different ways, the network addresses of the corresponding replacement network resources can be selected from different subranges As can be seen, by using the above described concepts, differentiated handling of data traffic related to one or more specific network resources can be implemented in a very efficient manner.

It is to be understood that the examples and embodiments as explained above are merely illustrative and susceptible to various modifications. For example, the concepts could be used in other types of communication network which benefit from differentiated handling of data traffic related to specific network resources, e.g., in IP based networks in general. In such other types of communication networks, other mechanisms than bearer assignments may be used for adapting the QoS level. For example, in an IP based network Differentiated Services Code Point Fields of the data packets could be set in order to adapt the QoS level. Also, the concepts may be applied to any number of different traffic classes. Moreover, differentiated handling may also be accomplished with respect to charging, gating, or redirection of data packets. Further, it is to be understood that the above concepts may be implemented by using correspondingly designed software in existing network devices, or by using dedicated network device hardware.

The invention claimed is:

1. A method for differentiated handling of data traffic related to a network resource, said data traffic being preceded by a lookup procedure for obtaining a network address of the network resource, the method implemented by a network device and comprising the steps of:
processing a message of the lookup procedure for adapting the lookup procedure to return a network address of a replacement network resource capable of replacing the network resource in communication of the data traffic,
wherein the network address of the replacement network resource is selected in accordance with a traffic class of the data traffic related to the network resource, and
whereby differentiated handling of the data traffic in said communication with the replacement network resource is accomplished using a packet classification rule operating on the basis of the network address of the replacement network resource.

2. The method according to claim 1, wherein said processing of the message comprises:
receiving a query for the network address of the network resource; and
responding to the query with the network address of the replacement network resource.

3. The method according to claim 1, wherein said processing of the message comprises:
receiving a response to a query for the network address of the network resource; and
modifying the response by replacing the network address of the network resource with the network address of the replacement network resource.

4. The method according to claim 1, wherein said processing of the message comprises redirecting a query for the network address of the network resource.

5. The method according to claim 1, wherein said packet classification rule is preconfigured.

6. The method according to claim 5, wherein the network address of the replacement network resource is selected from a network address range matching the packet classification rule.

7. The method according to claim 5, further comprising the steps of:
inspecting the data traffic, and
updating the packet classification rule on the basis of the inspection.

8. The method according to claim 1, wherein said differentiated handling comprises routing the data traffic to a bearer established across a radio interface.

9. The method according to claim 8, wherein the data traffic is routed to the bearer by a packet filter-operating on the basis of the network address of the replacement network resource.

10. The method according to claim 8, further comprising the step of:
establishing the bearer between a user equipment and a gateway when the user equipment attaches to the gateway.

11. The method according to claim 1, wherein a plurality of replacement network resources are provided for differentiating between data traffic related to corresponding network resources, and wherein the network addresses of the replacement network resources are each selected from a different network address range corresponding to a subnet.

12. The method according to claim 1, wherein the replacement network resource comprises a cache server or a tunnel edge server.

13. The method according to claim 1, wherein the replacement network resource operates as a proxy node for the network resource.

14. A network device, comprising:
an interface for receiving a message of a lookup procedure for obtaining a network address of a network resource, and
a processor configured to process the message so as to adapt the lookup procedure to return a network address of a replacement network resource capable of replacing the network resource in communication of data traffic and to select the network address of the replacement network resource in accordance with a traffic class of the data traffic related to the network resource,
whereby allowing for differentiated handling of the data traffic in said communication with the replacement network resource is accomplished using a packet classification rule operating on the basis of the network address of the replacement network resource.

15. A network system, comprising:
a replacement network resource capable of replacing a network resource in communication of data traffic;
a network device configured to process a message of a lookup procedure for obtaining a network address of the network resource, said processing adapting the lookup procedure to return a network address of the replacement network resource and to select the network address of the replacement network resource in accordance with a traffic class of the data traffic related to the network resource; and
at least one communication device configured to accomplish, on the basis of the network address of the replacement network resource, differentiated handling of the data traffic in said communication with the replacement network resource using a packet classification rule operating on the basis of the network address of the replacement network resource.

16. A non-transitory computer-readable medium which has an executable computer program product stored thereon, the computer program product comprising program code to be processed by a processor of a network device, thereby causing the network device to operate as follows:
processing a message of the lookup procedure for adapting the lookup procedure to return a network address of a replacement network resource capable of replacing the network resource in communication of data traffic,
wherein the network address of the replacement network resource is selected in accordance with a traffic class of the data traffic related to the network resource, and
whereby differentiated handling of the data traffic in said communication with the replacement network resource is accomplished using a packet classification rule operating on the basis of the network address of the replacement network resource.

* * * * *